United States Patent [19]

Madsen

[11] 4,194,557
[45] Mar. 25, 1980

[54] COOLER FOR MIXTURES OF CRYSTALS AND CRYSTALLIZING LIQUID IN THE PRODUCTION OF SUGAR AND RELATED PRODUCTS

[75] Inventor: Rud F. Madsen, Nakskov, Denmark

[73] Assignee: Aktieselskabet de Danske Sukkerfabrikker, Copenhagen, Denmark

[21] Appl. No.: 866,903

[22] Filed: Jan. 4, 1978

[30] Foreign Application Priority Data

Jan. 13, 1977 [DK] Denmark ................. 129/77

[51] Int. Cl.² ............ F28G 1/08; F28G 1/14; F28G 15/08; F28F 19/00
[52] U.S. Cl. ................. 165/94; 62/354; 62/544; 127/15; 165/109; 165/119; 165/120; 165/158; 165/174; 366/335
[58] Field of Search ........... 62/532, 543, 544, 353, 62/354, 303, 123; 165/94, 109, 95, 119, 111, 112, 113, 114, 120, 158, 174; 127/15; 366/332, 333, 334, 335

[56] References Cited

U.S. PATENT DOCUMENTS

| | | | |
|---|---|---|---|
| 2,601,972 | 7/1952 | Rose | 165/95 |
| 2,882,022 | 4/1959 | Greathouse et al. | 165/95 |
| 3,259,179 | 7/1966 | Leach | 165/95 |
| 3,384,161 | 5/1968 | Malmstrom et al. | 165/94 |
| 3,650,121 | 3/1972 | Kimpel et al. | 62/354 |
| 3,796,060 | 3/1974 | Moyers, Jr. | 62/544 |

FOREIGN PATENT DOCUMENTS

276087 10/1970 U.S.S.R. ................. 165/174

*Primary Examiner*—Sheldon Richter
*Attorney, Agent, or Firm*—Watson, Cole, Grindle & Watson

[57] ABSTRACT

A cooler for mixtures of crystals and crystallizing liquid in the production of sugar and related products comprises a bundle of vertical pipes for the passage of such a mixture from a bottom chamber to a top chamber. The vertical pipes are surrounded by a cooling medium, and in the interior of the pipes plungers are provided which have a somewhat smaller diameter than the inner wall of the pipes so as to form a slot-like passage along the inner wall of each pipe. The plungers are moved up and down through the pipes. The cooler is especially adapted for promoting crystallization by a rapid drop of temperature.

2 Claims, 3 Drawing Figures

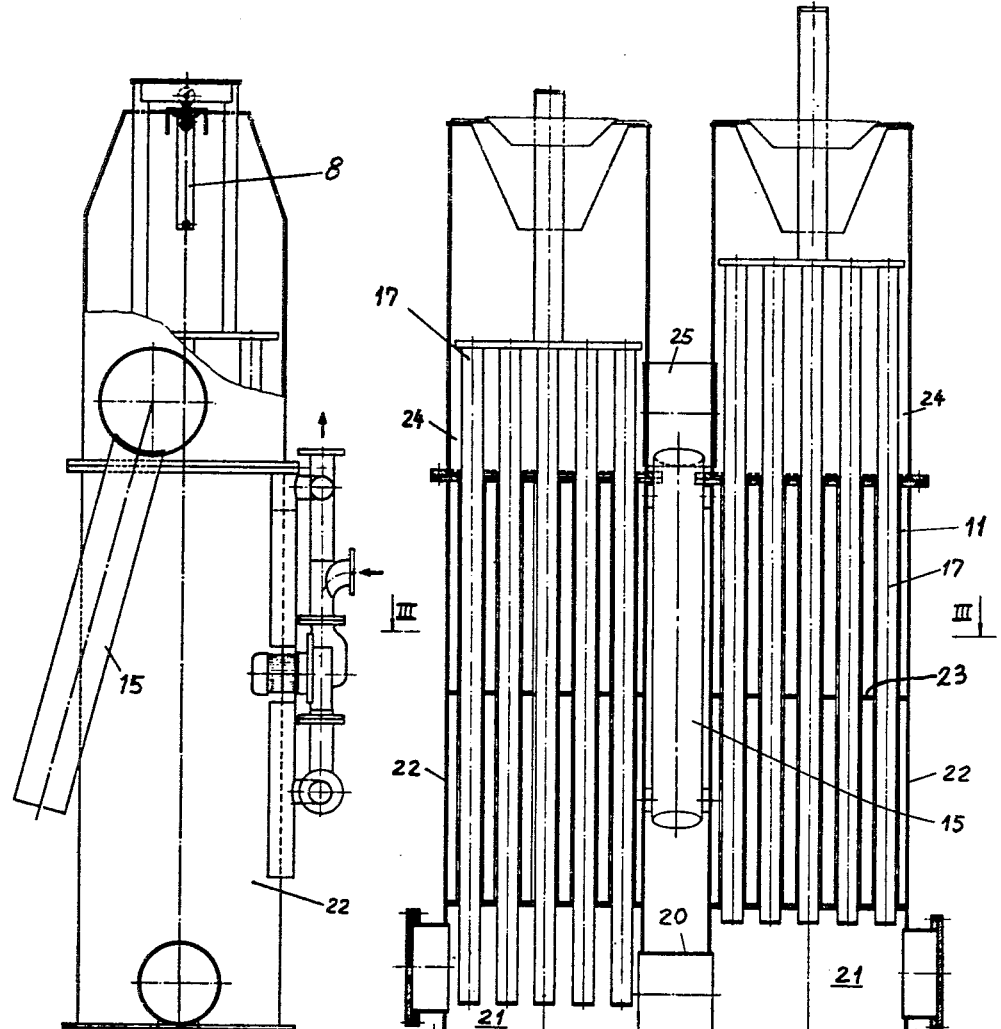
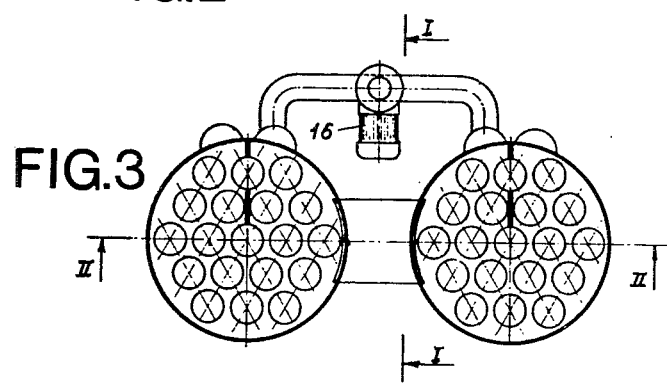

COOLER FOR MIXTURES OF CRYSTALS AND CRYSTALLIZING LIQUID IN THE PRODUCTION OF SUGAR AND RELATED PRODUCTS

BACKGROUND OF THE INVENTION

The invention relates to a cooler for mixtures of crystals and crystallizing liquid in the production of sugar and related products, such products, which during crystallization show a similar behaviour as sugar, including particularly other saccharides, such as fructose and glucose.

In the crystallization of easily soluble materials, the solubility of which increases with increasing temperature, crystallization is often effected by cooling a mixture of crystals and solution. This mixture will in the following be referred to as massecuite.

Such mixtures of crystals and solution frequently have a high apparent viscosity (consistency). This is e.g. the case in the crystallization of saccharose, fructose and glucose. The cooling meets with difficulties because the high viscosity results in a poor transfer of heat and because frequently a layer of crystals grows up on the cooling surfaces, thereby additionally reducing the heat transmission.

The cooling is frequently effected in containers with stirring mechanisms and with a movable or stationary cooling surface, which is cooled by water, air or other cooling media. The cooling is performed either batchwise or by causing the massecuite to flow continuously through one or more containers provided with cooling equipment. It has been found in practice that the limiting factor in the crystallization process is the obtainment of the sufficient temperature drop, and it is often difficult and expensive to build in the sufficient cooling surface area.

In order to obtain optimum crystallization with maximum yield it has been found by experiment that in the crystallization of the last product in the saccharose production it is useful to obtain a rapid cooling of the massecuite from the temperature of 70°-80° C. at which it is produced to 60° C., whereafter a slower cooling in traditional equipment is advantageous.

Coolers are known in the form of a pipe cooler having substantially vertical pipes through which a fluid is pumped and which opens into chambers at their bottom and top ends and are surrounded by a cooling medium, e.g. circulating water. However, these known coolers are not suitable for the cooling of mixtures of crystals and crystallizing liquids of the type here concerned, because a layer of of crystals is rapidly formed on the inner wall of the pipes, whereby the pipes can easily get clogged.

SUMMARY OF THE INVENTION

It is the object of the invention to remedy this drawback. According to the invention, plungers are provided in the pipes, which plungers in the whole or practically the whole pipe length fill out part of the cross-section of each pipe and therefore form a slot-like passage along the pipe wall, the plungers being coupled to means for moving them up and down through the pipes.

By the use of such plungers an increased transmission of heat is obtained owing to the slot-like section of the flow passage through the pipes, and it has been found that the movement of the plungers up and down through the pipes keeps the cooling surfaces clean and further increases the heat transmission.

In order to obtain maximum effect, the plungers should at any moment extend the whole way through the pipes and to achieve this the plungers should preferably be longer than the pipes, their ends moving up and down in the bottom and top chambers, whereby an efficient stirring of the massecuite in the bottom and top chambers is at the same time obtained.

In a particularly advantageous embodiment of the invention, the cooler comprises two cooler sections connected in parallel, the bottom and top chambers of which are respectively interconnected, the plungers of one section moving up while the plungers of the other section are moving down. As a result of this arrangement the total effect of the plungers in the chambers has no displacement effect, whereby heavy pressure variations are avoided.

BRIEF DESCRIPTION OF THE DRAWING

FIG. 1 shows a cooler according to one embodiment of the invention in side view with partial section along the line I—I in FIG. 3.

FIG. 2 is a vertical section along the line II—II in FIG. 3.

FIG. 3 is a horizontal section along the line III—III in FIG. 2.

DESCRIPTION OF THE PREFERRED EMBODIMENT

In the embodiment illustrated, the cooler comprises two cooler sections connected in parallel. The massecuite to be cooled is supplied through an inlet pipe 14 and passes through a connecting chamber 20 into bottom chambers 21 of two parallel coolers 22. The coolers comprise a number of pipes 11 surrounded by a cooling medium and opening at their top ends into top chambers 24, which are interconnected through a connecting chamber 25, to which an outlet pipe 15 is connected. On the cooling medium side baffles 23 are provided which increase the speed of flow, and a circulation pump 16 is used for increasing the speed of flow of the cooling medium and thereby the coefficient of transmission. In each pipe 11 there is provided a cylindrical plunger 17, e.g. consisting of a pipe into which sand may be filled for balancing. The diameter of the plunger is somewhat smaller than the diameter of the pipe wall so that an annular slot is formed. All plungers in each cooler are interconnected and are moved up and down by means of a hydraulic cylinder 8.

The movement can be so controlled that the plungers of one of the coolers are moved up, while the plungers of the other cooler are being moved down. Movement is thus produced at the bottom of the coolers, whereby the deposition of crystals is avoided and the pressure at the inlet is kept substantially constant.

The movement of the plungers of the two coolers may also take place simultaneously in the same direction, or the apparatus could be constructed with one cooler only. Thereby heavy pressure variations are produced. This is in some cases unacceptable, but in the cases where such pressure variations are acceptable the heat transmission will be somewhat higher than when the plungers are moved in counter phase.

The plungers can be constructed in various ways: as smooth pipes, as pipes with distributed scrapers, or as pipes having a diameter varying along the length of the pipes. For sugar manufacturing massecuite plungers in the form of ordinary smooth pipes have been found equally efficient as other forms.

EXAMPLE

In a cooler of the type illustrated working at an inlet temperature of the massecuite of 75° C., an outlet temperature of 64° C. and a temperature of the cooling medium of 40° C. in the processing of the afterproduct in sugar manufacturing a heat transmission coefficient of 0.67 kcal/°C. min.m$^2$ has been measured. The stroke of the plungers was 30 cm, the pipe diameter 15 cm, the plunger diameter 11 cm and the pipe length 200 cm.

I claim:

1. A cooler for mixtures of crystals and crystallizing liquid in the manufacture of sugar and related products consisting of a pipe cooler having substantially vertical pipes, which open into chambers at their bottom and top ends, characterized by the provision in the pipes of plungers which in the whole or practically the whole pipe length have a cross-sectional area somewhat smaller than the cross-sectional area of the pipe wall so as to fill out a substantial part of the cross-section of each pipe and thereby to form an annular passage along the pipe wall, the plungers being coupled to means for constantly and continuously moving them up and down through the pipes, the plungers extending at any moment the whole way through the pipes, their ends moving up and down in the bottom and top chambers.

2. A cooler as in claim 1, characterized in that it comprises two cooler sections connected in parallel, the bottom and top chambers of which are respectively interconnected, the plungers of one section moving up while the plungers of the other section are moving down.

* * * * *